A. GREENWELL.
RUBBER TIRE CUTTING MACHINE.
APPLICATION FILED FEB. 5, 1913.
1,090,297.
Patented Mar. 17, 1914.
2 SHEETS—SHEET 1.
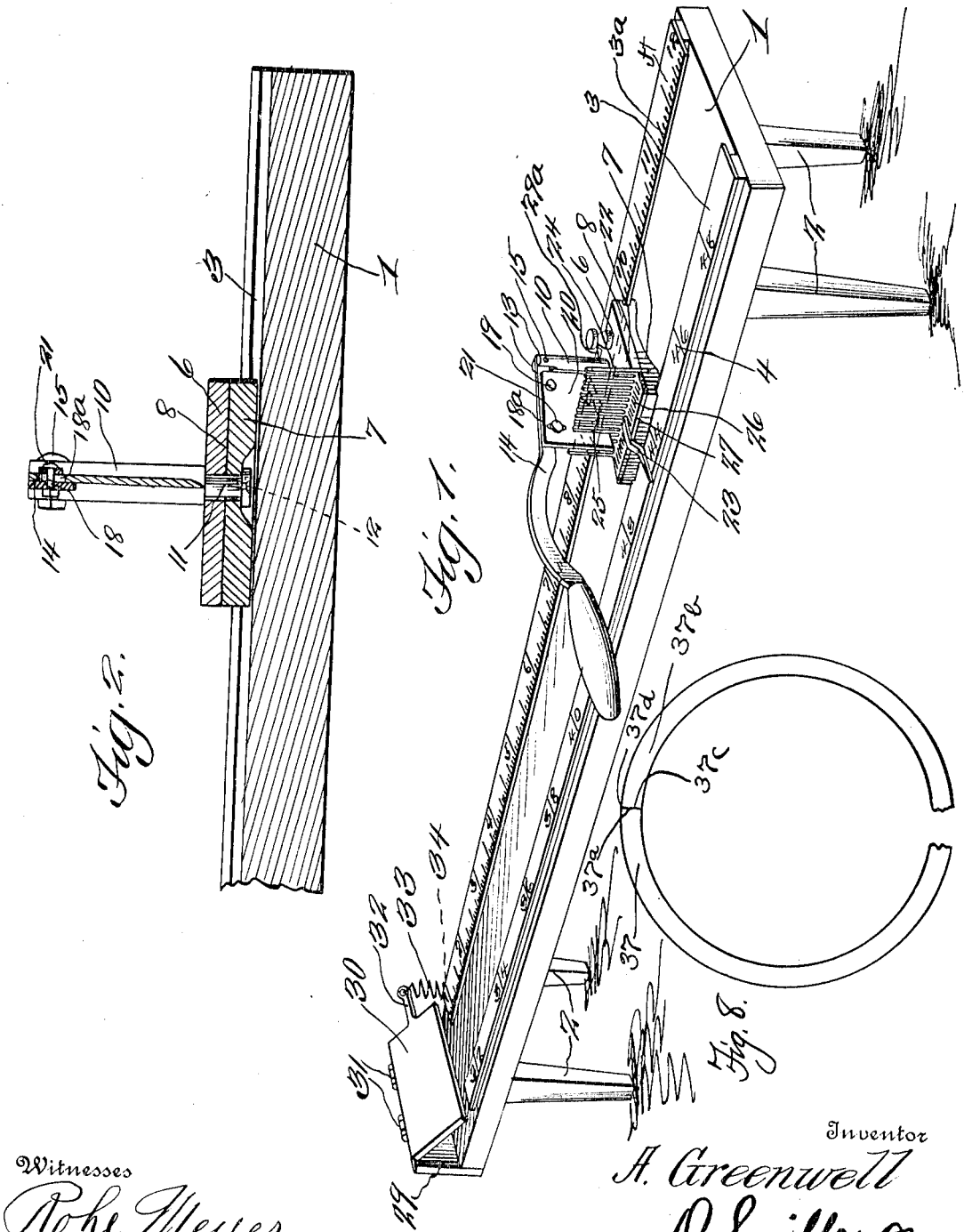

A. GREENWELL.
RUBBER TIRE CUTTING MACHINE.
APPLICATION FILED FEB. 5, 1913.
1,090,297.
Patented Mar. 17, 1914.
2 SHEETS—SHEET 2.
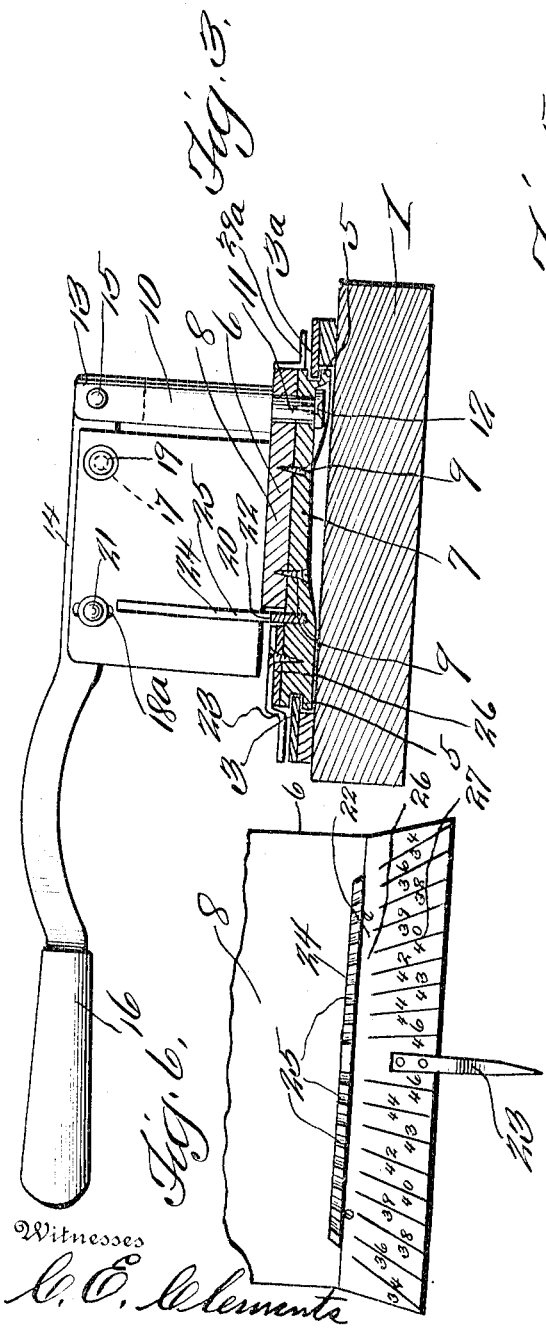
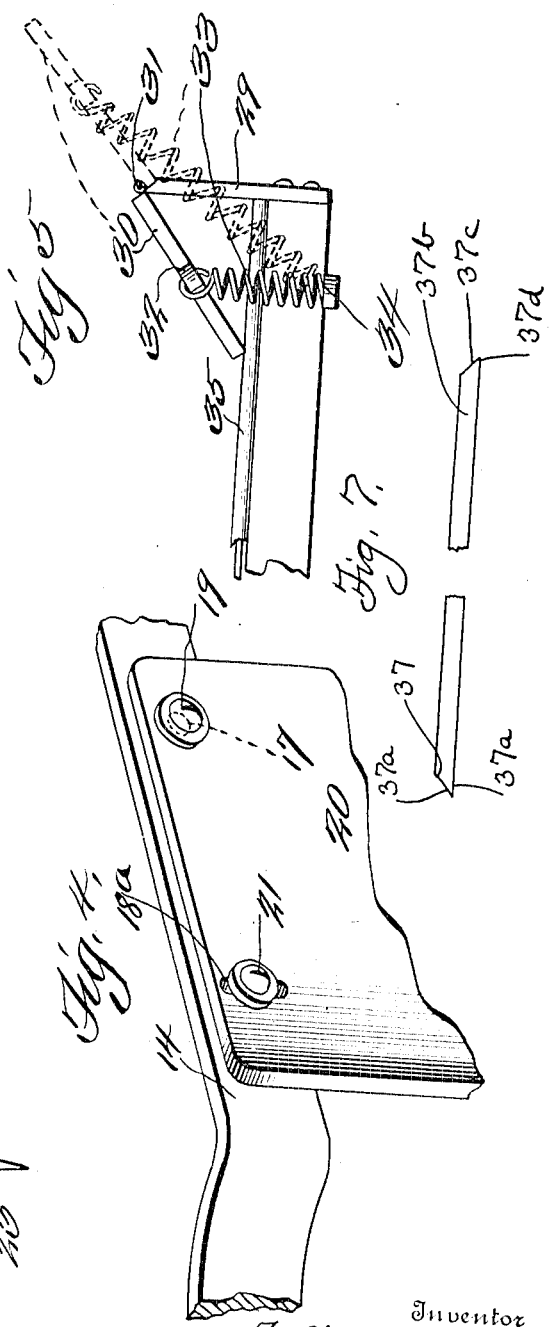
Witnesses
C. E. Clements
Francis G. Boswell
Inventor
A. Greenwell
By D. Swift & Co.,
his Attorneys

UNITED STATES PATENT OFFICE.

ALFONSO GREENWELL, OF OWENSBORO, KENTUCKY.

RUBBER-TIRE-CUTTING MACHINE.

1,090,297.

Specification of Letters Patent. Patented Mar. 17, 1914.

Application filed February 5, 1913. Serial No. 746,398.

*To all whom it may concern:*

Be it known that I, ALFONSO GREENWELL, a citizen of the United States, residing at Owensboro, in the county of Daviess and State of Kentucky, have invented a new and useful Rubber-Tire-Cutting Machine; and I do hereby declare the following to be a full, clear, and exact description of the invention, such as will enable others skilled in the art to which it appertains to make and use the same.

This invention relates to a new and useful rubber tire cutting machine, and one not only for cutting or severing tires, but one whereby the ends of the tires are held even and clamped, after which each tire is measured, and then severed.

An object of the invention is the provision of an elongated table member having a pair of guide tracks, on which a carriage is movable.

Another object of the invention is the provision of graduations, in registration with any one of which the carriage may be set, in order that a tire may be cut the desired length by the knife, which is pivoted to a swiveled post or standard on the carriage.

A feature of the invention is the provision of a knife guide, the plurality of slots of which is arranged vertically, and the angles of the slots are alined with the swiveled post.

Another feature of the invention is the provision of means whereby the knife blade may be arranged on the pivoted arm of the standard, so as to squarely contact with the buffer board of the carriage.

There are disclosed in the drawings certain features of construction, but in practical fields these features may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a view in perspective of the improved tire cutting machine. Fig. 2 is a longitudinal sectional view. Fig. 3 is a transverse sectional view through the carriage. Fig. 4 is a detail sectional view, showing how the knife is held upon the pivoted arm. Fig. 5 is an enlarged detail view of the clamp at one end of the table. Fig. 6 is a detail plan view of a portion of the carriage, showing the slots 25 and the pointer 23 and the graduations of the carriage. Fig. 7 is a detail view of a portion of the tire, showing the ends thereof cut. Fig. 8 is a detail view showing how the tire is arranged annularly so that the beveled ends will fit.

Referring to the drawings more particularly, 1 designates a table, which may be constructed any suitable length or width. This table is supported by the legs 2, and mounted or secured upon the table, and corresponding with the length thereof are two guide tracks 3, one of which is graduated as shown at 4. These guide tracks have their inner edge portions raised or spaced apart up from the top of the table, in order to receive the guide tongues 5 of the carriage 6 between the tracks and the table. The carriage consists of a metallic under base member 7 and a wood buffer plate or bed 8. The wood buffer plate or bed is secured to the under base member by the screws 9. A post or standard 10 having a reduced end 11 rises from the wood buffer plate or bed. The reduced end 11 passes through the buffer bed, and has a screw 12 threaded therein, in order to swively mount the post upon the carriage. The upper end of the post 10 is bifurcated, and between the forks 13 of said bifurcation a lever arm 14 is pivoted by means of the bolt 15. This lever arm 14 terminates in a handle 16 at one end. The lever arm is provided with two openings 17 and 18. A bolt 19 passes through the knife blade 20 and through the opening 17, and is provided with a nut, thereby partly attaching the knife blade to the lever arm. A bolt 21 passes through an elongated opening $18^a$ at the other end of the knife blade and through the opening 18 of the lever arm.

In arranging the knife blade on the lever arm, in order that the knife edge thereof will squarely contact with the buffer bed, the knife blade may be moved pivotally on the bolt 19, until the desired position is attained, after which the nut on the bolt 21 may be tightened. The elongated opening $18^a$ allows the knife to be swung pivotally upon the bolt 19, when arranging the knife blade in position.

Carried by the carriage is an angular member or plate 22, which is secured to that portion of the carriage which moves adjacent the graduated guide track, there being a pointer 23, which coöperates with the graduations, in setting the carriage in its desired position. This angular member has its vertical portion 24 provided with a series of slots 25. These slots are disposed in a line with the center of the post 10, so that the knife blade may be received in any one of the slots when brought into registration therewith. The swiveling of the post 10 allows the knife blade to be brought opposite any one of the notches of the angular member. These slots or notches act as guides for the knife blade. The horizontal portion 26 of the angular member is also provided with graduations 27, each one of which is disposed opposite each one of the slots or notches 25.

Secured to one end of the table is a plate 29, to the upper edge of which a swinging plate or clamp 30 is hinged, as at 31. One end of the plate or clamp 30 has an arm 32, to which one end of a spring 33 is connected, while the other end of the spring is connected to the table as at 34. The spring 33 constitutes means to hold the plate or clamp 30 down against the rubber tire material 35, in order to clamp the same in position, while being measured and severed. The plate 29 is designed for the purpose of being contacted with by the rubber tire material, for holding all the sections of the material even, that is, when the clamping plate 30 is raised or thrown upwardly, the spring 33 acting not only to hold the clamping plate 30 against the material, but also hold the same raised or opened, as shown in dotted lines in the drawings.

In the operation of the machine the tire material is pulled off the reel and disposed across the carriage adjacent the rear face of the knife guide, the knife having been first raised, with the end of the material adjacent or in contact with the plate 29 and held in such position by the clamping plate 30. However, before arranging the material in this manner, the carriage is disposed so that the pointer is opposite the graduation on one of the guide tracks, indicating the desired length of the tire, after which the knife blade is lowered, thereby cutting the tire. Before cutting the length of the tire, the first end 37 of the tire material is cut on an angle or beveled, substantially as shown at $37^a$ in Fig. 7, by moving the knife blade opposite the slot shown in Fig. 1, which indicates the angle or bevel desired. Then when cutting off the desired length of tire, the other end $37^b$ of the tire is cut on an angle $37^c$ to correspondingly fit the first angle or bevel at the first end of the tire, that is, when the ends of the tire are brought together, as shown in Fig. 8. To cut the proper angle or bevel of the other end $37^b$, the knife blade is arranged adjacent to and operable downwardly into the proper slot, just the opposite to that shown in Fig. 1 on the other side of the pointer 23. Owing to the fact that various carriage wheels vary in diameter, the angles at the ends of the tire correspondingly vary, therefore the series of slots 25 are provided.

To cut a rubber tire to fit a certain size wheel, it is first necessary to find the circumference of the wheel. The carriage is then set with the pointer $29^a$ opposite the proper graduation (which corresponds to the circumference of the wheel, allowing a certain number of inches for compression, and also allowing for the angled or beveled end 37 and $37^b$) upon the track $3^a$. After the carriage has been set and the thumb screw $29^b$ tightened, the tire material is then unreeled from a reel (not shown), and placed upon a table with one end of the tire material in contact with the plate 29. However, before so arranging the tire material, the end 37 is cut on a bevel or angle $37^a$, by moving the knife downwardly into one of the slots 25 on the left hand side of the pointer 23. The graduations 27 are according to the various diameters of wheels, therefore in beveling the end 37 of the tire material, the blade is operated in the slot opposite a particular graduation according to the diameter of the wheel. For instance, if the diameter of the wheel is thirty-four inches, the knife would be operated into the slot having thirty-four opposite the same, and if the wheel is forty inches in diameter the knife will be operated into the slot with forty opposite, as shown in Fig. 1. After the end 37 has been beveled as shown at $37^a$ the tire material is disposed or arranged longitudinally upon the table with the beveled end 37 in contact with the plate 29, and held in such position by the spring-tensioned clamping plate 30. The knife blade having first been raised, so that the tire material may be arranged transversely of the carriage between the post 10 and the vertical portion 24 of the angular member or plate 22. After the tire material has been so arranged, the knife blade is swung horizontally, so that the cutting edge is opposite the slot upon the right side of the pointer 23, say for instance, the slot with the graduations 40 opposite the same, so as to correspond with the slot upon the left side of the pointer 23. In this manner when the tire material is so cut, the beveled ends $37^a$ and $37^c$ will squarely meet or come together as shown in Fig. 8, the points $37^d$ contracting or receding from one another. In practice the graduations of the track $3^a$ are to be so arranged with relation to the graduations on the track 3, so that when the carriage is set with the pointer $29^a$ opposite the proper graduation (indicating the circumference of the wheel) of the track $3^a$, the pointer 23 will register the proper graduation on the track 3 indicating the diameter of the wheel.

The invention having been set forth, what is claimed as new and useful is:—

1. In combination, a table having longitudinal guide tracks thereon, a combination abutment and clamp at one end of the table, a carriage movable on the guide tracks, a knife universally connected to the carriage, an angular member having a vertical portion having slots, the angles of which are alined with the universal connection of the knife, the universally connected knife and slots constituting means whereby the opposite ends of a tire may be cut with corresponding fitting angles.

2. In combination, a table having longitudinal guide tracks thereon, a tire abutment at one end of the table, a carriage movable on the guide tracks, a knife universally connected to the carriage, a member having slots, the angles of which are alined with the universal connection of the knife, the universally connected knife and slots constituting means whereby the opposite ends of a tire may be cut with corresponding fitting angles.

3. In combination, a table having longitudinal guide tracks thereon, a tire abutment at one end of the table, one of the tracks having graduations, a carriage movable on the tracks, a knife universally connected to the carriage, a member having slots the angles of which are alined with the universal connection of the knife, whereby the knife may be brought opposite any one of the slots, the universally connected knife and slots constituting means, whereby the opposite ends of the tire may be cut with corresponding fitting angles, the member having graduations with which the knife coöperates and provided with a pointer to coöperate with the graduations on one of the tracks.

4. In combination, a table having longitudinal guide tracks thereon, a tire abutment at one end of the table, a carriage movable on the guide tracks, a post swivelly mounted on the carriage to rock horizontally, a knife pivoted to the post to swing vertically, a member on the carriage having slots, the angles of which are alined with the post, whereby the knife when moved horizontally owing to the swiveled connection of the post the same may be brought opposite any one of the slots, the slots, the knife and the mounting thereof constituting means whereby the opposite ends of a tire may be cut with correspondingly fitting angles.

5. In combination, a table having longitudinal guide tracks thereon, a tire abutment and clamp at one end of the table, a carriage movable on the guide tracks, one of the tracks having graduations, a post swiveled on the carriage to rock horizontally, a knife pivoted to the post to swing vertically, a member on the carriage having slots the angles of which are alined with the post, whereby the knife when moved horizontally owing to the swiveled connection of the post the same may be brought opposite any one of the slots, the member having graduations, each of which is arranged opposite each slot, a pointer carried by the member to coöperate with the graduations of one of the tracks, the slots, the knife and the mounting thereof constituting means whereby the opposite ends of a tire may be cut with correspondingly fitting angles.

In testimony whereof I have signed my name to this specification in the presence of two subscribing witnesses.

ALFONSO GREENWELL.

Witnesses:
A. F. BRABANDT,
JOHN L. LESH.